United States Patent
Lang et al.

(10) Patent No.: US 7,682,549 B2
(45) Date of Patent: Mar. 23, 2010

(54) METHOD AND APPARATUS FOR PRODUCING DECORATIVE ELEMENTS

(75) Inventors: Sven Lang, Bad Schönborn (DE); Dieter Schweigert, Bahlingen (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 1199 days.

(21) Appl. No.: 11/209,663

(22) Filed: Aug. 24, 2005

(65) Prior Publication Data

US 2006/0043631 A1    Mar. 2, 2006

(30) Foreign Application Priority Data

Aug. 24, 2004    (DE) ...................... 10 2004 040 942

(51) Int. Cl.
*B29B 7/00*    (2006.01)
*B29C 45/14*    (2006.01)

(52) U.S. Cl. ................... 264/328.7; 264/279

(58) Field of Classification Search .............. 264/328.7, 264/279

See application file for complete search history.

(56) References Cited

U.S. PATENT DOCUMENTS 5,795,526 A * 8/1998 Matsumoto et al. ......... 264/266

2004/0227270 A1 * 11/2004 Takebe et al. ............... 264/255

FOREIGN PATENT DOCUMENTS

| DE | 41 24 297 A1 | 1/1993 |
|---|---|---|
| DE | 43 01 444 A1 | 7/1994 |
| DE | 43 36 550 A1 | 5/1995 |
| DE | 199 49 263 A1 | 4/2001 |
| JP | 3-30922 A | 2/1991 |
| JP | 10-109331 A | 4/1998 |
| JP | 2001-88166 A | 4/2001 |
| WO | WO 03/057446 A1 | 7/2003 |

* cited by examiner

*Primary Examiner*—Joseph S Del Sole
*Assistant Examiner*—Jeremiah Smith
(74) *Attorney, Agent, or Firm*—Sughrue Mion, PLLC

(57) ABSTRACT

An apparatus for producing decorative elements (43), in particular for vehicles, includes a first mould plate (10); a second mould plate (20), which is movable relative to the first mould plate, such that the apparatus may be brought into an open and a closed position. The second mould plate includes a frame (21) and an exchangeable shaping core (22, 23) movable relative to the frame; and a clamp (30), which is arranged and movable in such a way that the entire circumferential zone (44) of a workpiece (40) is fixed to the frame (21) of the second mould plate (20) by the clamp. An associated method is also disclosed.

7 Claims, 5 Drawing Sheets

METHOD AND APPARATUS FOR PRODUCING DECORATIVE ELEMENTS

TECHNICAL FIELD

The present invention relates to a method and an apparatus for producing decorative elements with a visible side and a backing side, such as for example internal trim elements, covers and the like. For the purposes of the present invention a decorative element means an element which includes a decorative material, such as for example wood veneer, film, textile, leather, etc., which from the visible side of the decorative element enhances the appearance of said decorative element. Such decorative elements are used in particular in the automotive industry, but also find similar application in other vehicles such as for example aeroplanes, trains or ships.

PRIOR ART

The above-described decorative elements are produced as a rule in such a way that an already preshaped decorative material preform is initially introduced into a first injection moulding means, in order to back-mould the decorative material preform, i.e. to apply a backing layer of synthetic resin to its backing side. In a next step, the decorative element is transferred to a second injection moulding apparatus and is over-moulded in this apparatus, i.e. a preferably transparent synthetic resin layer is applied to the visible side of the decorative material preform. Thus, the decorative element to be produced consists substantially of three layers, namely the decorative material layer, the synthetic resin layer on the visible side of the decorative layer and the backing layer on the backing side of the decorative layer.

Such decorative elements and the above-described mode of production are described for example in DE 41 24 297 C2 and DE 43 01 444 C2.

As has been described above, when such decorative elements are produced the decorative material is firstly shaped, the resultant decorative material preform then being introduced into a first injection mould. This is followed by changing the intermediate product over into a second injection mould and finally by a trimming process. To simplify such a production process, thought has been given to performing the above-stated method steps all in one mould. An apparatus or method for producing an above-mentioned substantially three-part decorative element is hitherto unknown in the prior art, however.

DE 43 36 550 C2 does disclose a method for the production of internal components for motor vehicles and a corresponding apparatus in which shaping, injection moulding and trimming are performed in one mould. However, DE 43 36 550 C2 defines such an internal component as consisting of a backing material which lends dimensional stability to a flexible decorative material such as for example leather, fabric or carpet. As a rule, however, such decorative materials are not provided with an additional transparent plastics layer on their visible side, like the above-described decorative elements, to whose production the present invention relates. Consequently, DE 43 36 550 C2 does not disclose over-moulding of internal trim elements. In addition DE 43 36 550 C2 does not teach how trimming of the internal component actually proceeds in the same apparatus or indeed that the outer contour of the internal component could be trimmed to the final dimensions.

SUMMARY OF THE INVENTION

Taking the above statements as basis, the technical problem of the present invention is that of providing a method and an apparatus for producing decorative elements, in particular for motor vehicles, which makes it possible to produce substantially three-part decorative elements of the above-described type in just one apparatus, without the workpiece having to be transferred between steps into another apparatus, while allowing simple trimming of the entire outer contour of the decorative element in the same apparatus, wherein it is intended that the method and the apparatus should be of as compact and simple design as possible.

The basic concept of the present invention is to provide a method which is simple to perform and an apparatus of simple construction, which make it possible to carry out in one apparatus the shaping, over- and back-moulding and trimming of the entire outer contour required to produce a decorative element. Whether over-moulding is performed first, followed by back-moulding or vice versa is of no relevance to the present invention.

To this end, the method according to the invention comprises the following steps:

insertion of a flat, flexible decorative blank of a decorative material with a visible side and a backing side as the workpiece to be processed into an apparatus and fixing of the workpiece precisely in position in the apparatus, wherein the entire circumferential zone or part of the contour of the workpiece is clamped. During or after fixing in place, the workpiece is shaped in the same apparatus. The visible side of the workpiece is then over-moulded with synthetic resin and the backing side of the workpiece is back-moulded likewise in the same apparatus. Trimming of the workpiece over the entire circumference or around the contour of the decorative element to be obtained is achieved by relative movement of the fixed circumferential zone of the workpiece relative to the remaining area of the workpiece positioned inside the circumferential zone.

The apparatus according to the invention for producing decorative elements accordingly comprises a first mould plate or a first mould half and a second mould plate or a second mould half. The second mould plate is movable relative to the first mould plate, such that the apparatus may be brought into an open and a closed position. In addition, the second mould plate comprises a frame and an exchangeable shaping core movable relative to the frame. For the purposes of the present invention, a shaping core means a core which accordingly forms a mould cavity for injection moulding with the counterpart of the first mould plate or serves as a shaping die for shaping a workpiece. In order to be able to perform back-moulding and over-moulding in the same apparatus, this shaping core must be exchangeable, since two different mould cavities have to be formed for over-moulding and back-moulding. In addition, the apparatus according to the invention comprises a clamping means, which is arranged and movable in such a way that the entire circumferential zone of workpiece may be fixed to the frame of the second mould plate by the clamping means. Together with the frame of the second mould plate, the clamping means holds the entire circumferential zone of the workpiece in accordance with the method according to the invention, while the core is movable relative to the frame and, by a movement relative to the frame, effects trimming of the workpiece over the entire circumference.

Advantageous further developments of the method according to the invention and of the apparatus according to the invention are also disclosed.

For instance, the method preferably involves insertion of a decorative blank of a wood veneer, a stone veneer, a film or any other desired decorative material into the apparatus. Such decorative materials are used as a rule for the production of the above-described decorative elements, i.e. they are both over- and back-moulded.

In the method according to the invention, the workpiece or the finished decorative element is advantageously ejected after completion of trimming by the relative movement of the fixed circumferential zone of the workpiece relative to the remaining zone of the workpiece positioned inside the circumferential zone. Manual removal of the decorative element from the apparatus is therefore unnecessary.

Furthermore, a preferred feature of the method is that the relative movement takes place along one axis and all movable parts of the apparatus are moved solely parallel to this axis. This development leads to a simple and uncomplicated embodiment of the method, since components have to be displaced only in one direction. Of course, additional movements along other axes may also be provided, for example if this is required by a particular decorative element geometry.

According to an advantageous further development of the apparatus according to the invention, the core is movable in the closed position and the open position of the apparatus. This means that, on the one hand, in the closed position the core may be moved out of the frame and appropriately replaced by another core, as is necessary for injection moulding of two opposing surfaces of a workpiece in a common apparatus. On the other hand, the core may also be moved in the open position, such that the trimming process may be performed.

In the apparatus according to the invention, the clamping means is preferably movable independently of the first mould plate, so enabling simple removal of the waste which arises as a result of trimming.

In addition, it is preferable for the frame of the second mould plate to comprise an opening in which the movable core is accommodated, wherein the opening corresponds to the external circumferential shape or contour of the decorative element.

In addition, according to a preferred embodiment of the present invention, the clamping means comprises an opening which corresponds to the external circumferential shape or contour of the decorative element.

If both the frame of the second mould plate and the clamping means comprise an opening matching the contour of the decorative element, an edge of the opening in the clamping means, facing the frame of the second mould plate, is aligned with an edge of the opening in the frame of the second mould plate, facing the clamping means. This development serves primarily to make the edges into cutting edges, in order to allow trimming of the decorative element and achieve a clearly defined cut edge.

In a preferred embodiment of the present invention, the clamping means and the first mould plate together form a mould cavity and the opening in the clamping means is defined by a wall, which tapers conically towards the second mould plate. Such a taper is conventional in injection moulding and it may be used to obtain an undercut in the workpiece.

Alternatively, the wall defining the opening in the clamping means may also taper conically towards the first mould plate.

In accordance with the configuration of the taper, the core of the second mould plate may be moved contrary to the direction of taper of the wall of the clamping means defining the opening for the purpose of trimming of the decorative element. This makes it possible for trimming of the decorative element to be performed in the same apparatus, wherein the entire shaping male mould or core serves as a cutting die or trimming tool. It also makes it possible to cut the decorative element to final dimensions despite the undercut edge, i.e. subsequent trimming is no longer necessary.

Advantageously, the apparatus according to the invention comprises a first sprue arranged in the first mould plate for injecting synthetic resin into a first mould cavity and a second sprue arranged in the second mould plate for injecting synthetic resin into a second mould cavity.

The first mould cavity may be formed between the first mould plate and a workpiece supported by a first core of the second mould plate, wherein the second mould cavity may be formed between a workpiece and a second core of the second mould plate.

It is additionally preferred in accordance with the method that the core be movable along one axis and that the clamping means and the first mould plate be movable relative to the second mould plate only parallel to this axis. This results in a simple, uncomplicated apparatus structure, in which only one stroke direction or movement direction is necessary for the moving parts.

BRIEF DESCRIPTION OF THE DRAWINGS

Further advantages and developments as well as features of the present invention are revealed by the following detailed description of an exemplary embodiment made with reference to the accompanying drawings.

FIGS. 1-5 of the Figures illustrate an exemplary embodiment of an apparatus according to the present invention, wherein FIGS. 1-5 show in sequence different stages of an example of the method according to the present invention, which uses this apparatus.

Consequently, in the different views, identical parts are designated by identical reference numerals.

DESCRIPTION OF AN EXEMPLARY EMBODIMENT

With reference to FIGS. 1-5, the structure of the apparatus according to an exemplary embodiment of the present invention will firstly be explained.

Figure 1:
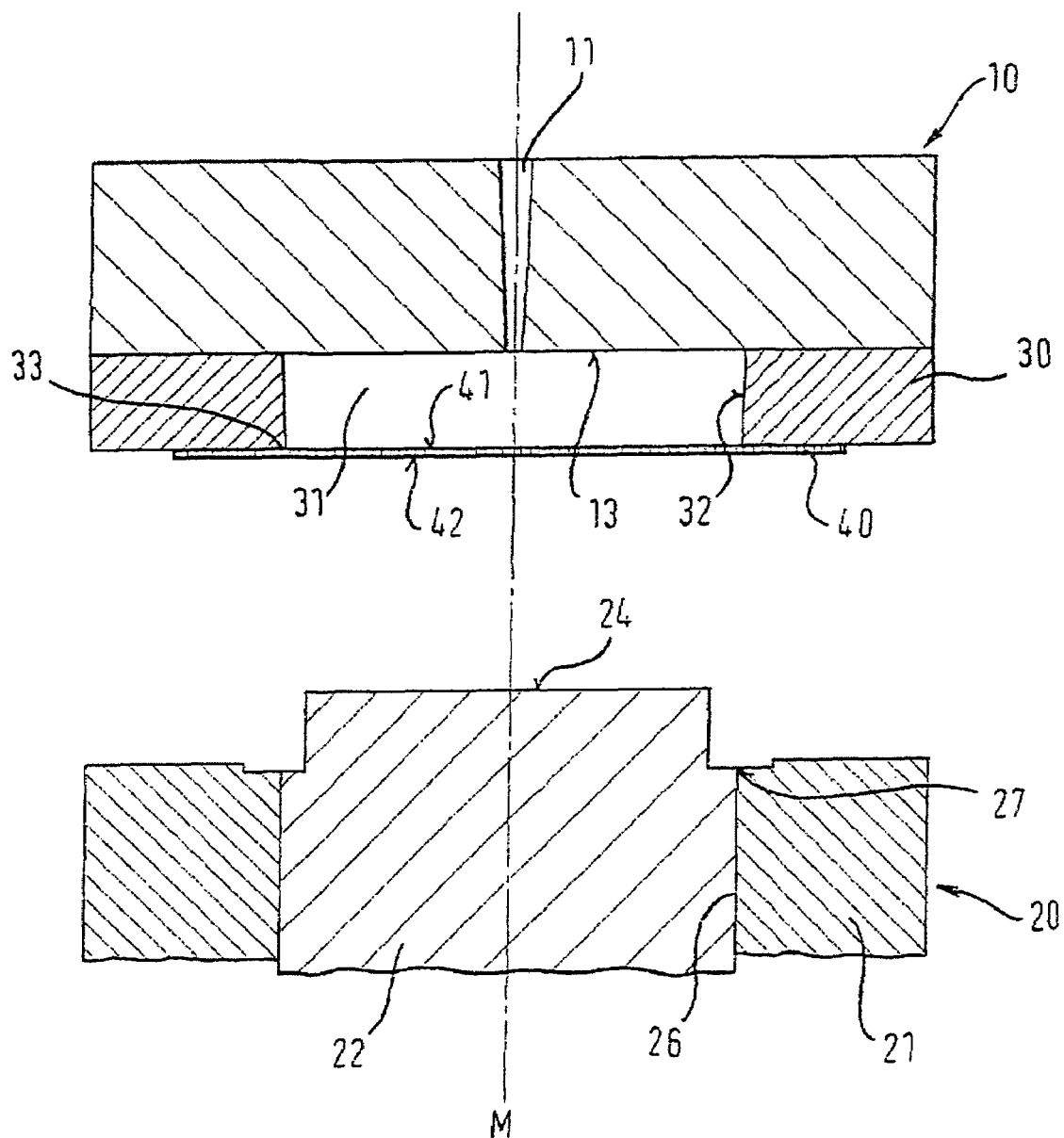

The apparatus according to the invention in FIG. 1 comprises a first mould plate (10) and a second mould plate (20). The second mould plate (20) comprises a frame (21) and a first core (22). The first core (22) is movable relative to the frame (21) along the axis M. The surface (24) of the core (22) corresponds substantially to the three-dimensional shape of the decorative preform, the production of which will be explained later. As will also be made clear, the movability of the core (22) along the axis M serves on the one hand in changing or exchanging the core (22) for a second core (23) (see FIG. 3), which serves as a male mould in an injection moulding process and therefore exhibits a shaping surface (25), and on the other hand in trimming the decorative element preferably to final dimensions.

In the first mould plate (10) there is provided a first sprue (11). The second mould plate (20) likewise comprises a sprue, which is designated as second sprue but which is not illustrated in the Figures.

A clamping means (30) is arranged between the first mould plate (10) and the second mould plate (20). The clamping means (30) comprises an opening (31), which is defined by a wall (32). The opening (31) in the clamping means (30) corresponds at one edge (33) of the opening, facing the second mould plate (20), to the final contour of the decorative element to be produced. As is clear for example from FIG. 1, the wall (32) of the clamping means (30) is additionally tapered from the side or edge facing the first mould plate (10)

to the edge or side facing the second mould plate (20) or the frame (21). In the cross-section illustrated, the opening thereby takes the shape of a truncated cone.

Figure 4:
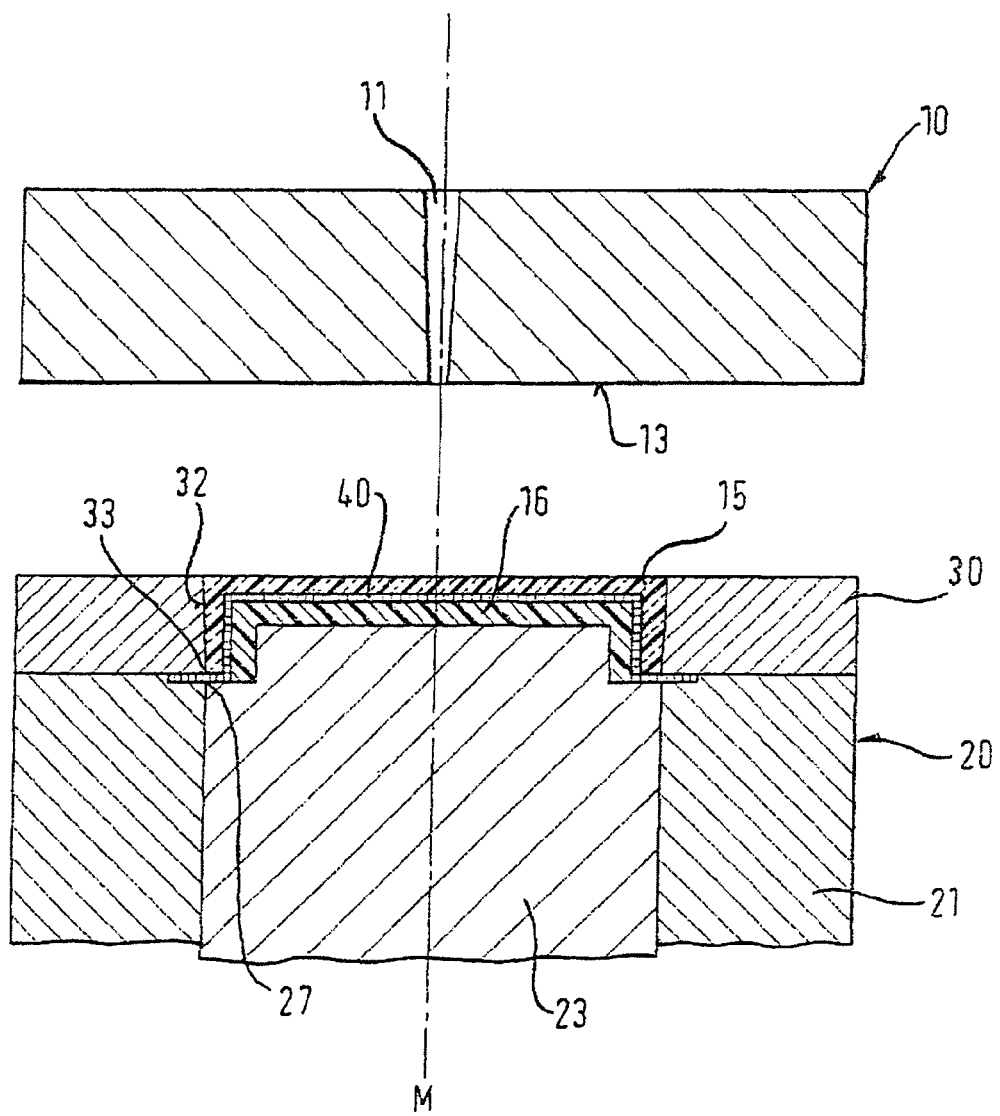
Figure 5:
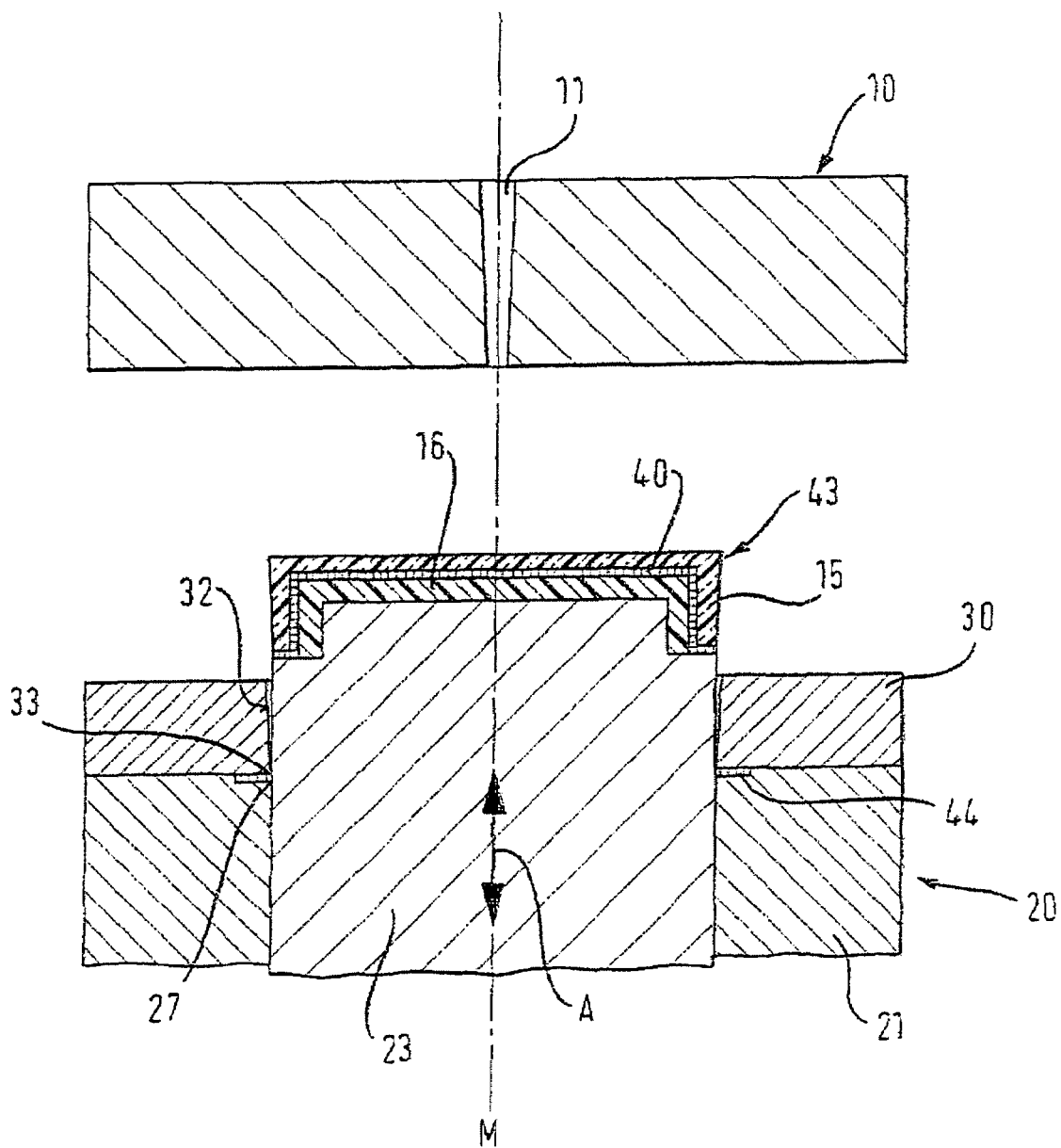

Both the clamping means (30) and the first mould plate (10) are movable relative to the second mould plate (20) along the axis M in two directions, as shown by the double-headed arrow A in FIG. 5. In addition, as is clear from FIG. 4 the clamping means (30) is movable independently of the first mould plate (10).

The frame (21) of the second mould plate (20) also comprises an opening (26). The core (22) or (23) is introduced into this opening (26) and is movable along this opening. In other words, this opening (26) also serves as a guide for the core. Furthermore, the opening corresponds at least at an edge (27) of the opening facing the clamping means to the contour or outer circumference of the decorative element to be produced and is therefore aligned with the edge (33) of the clamping means (30).

Figure 2:
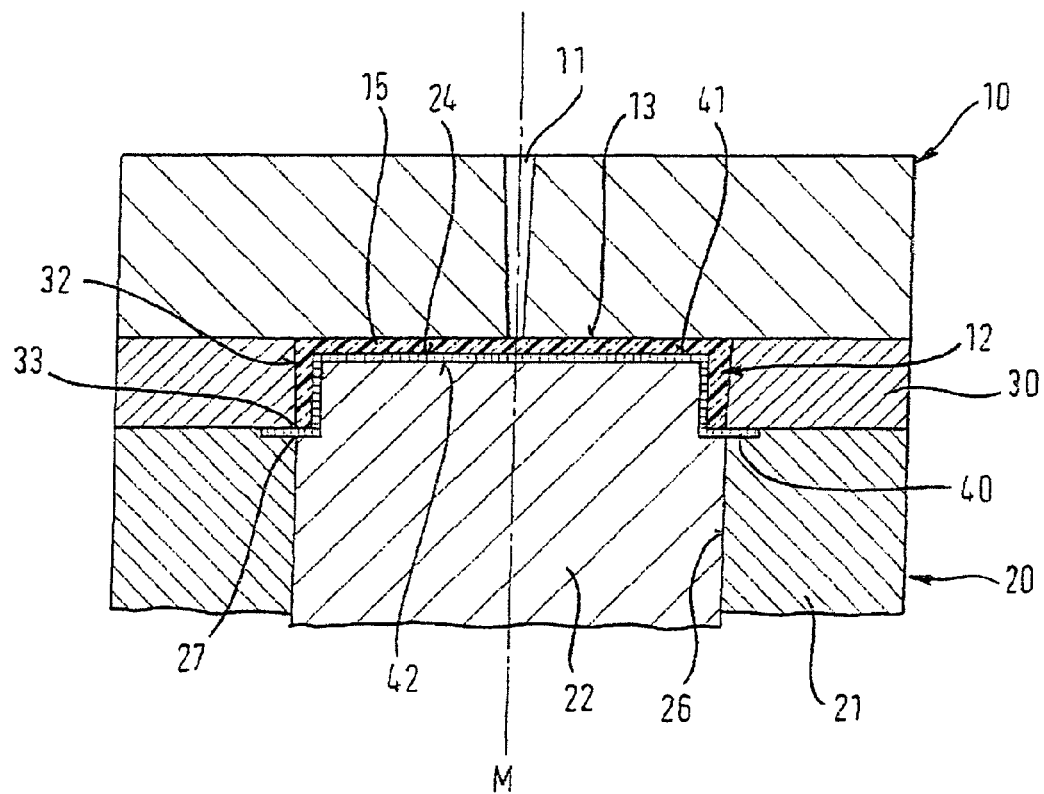
Figure 3:
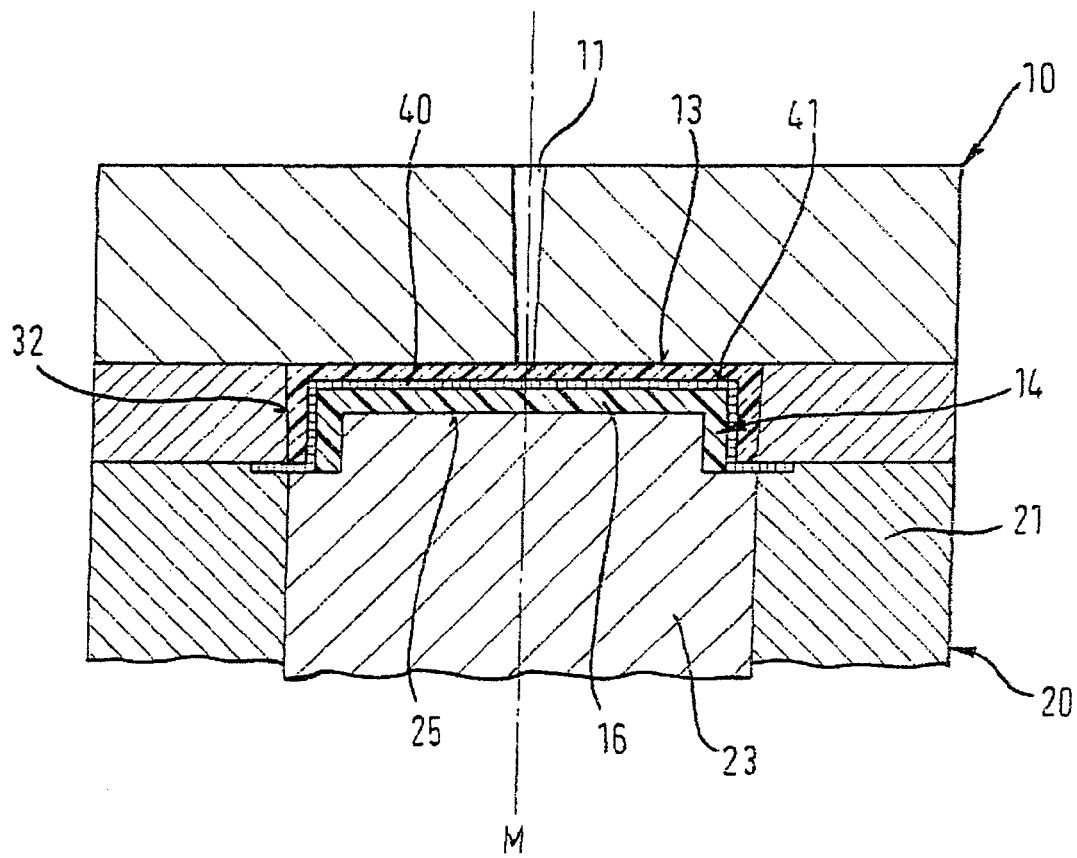

As a result of the movability of the first mould plate (10) relative to the second mould plate (20), the apparatus may be brought into an open position (see FIG. 1, FIG. 4 and FIG. 5) and a closed position (see FIG. 2 and FIG. 3). In the closed position, which is illustrated in FIG. 2, the first core (22) forms a supporting surface (or shaping surface) for the decorative blank (40) and a first mould cavity (12) is formed between the decorative blank (40) and the wall (32) of the clamping means and a surface (13) of the first mould plate. An injection moulding material is injected into this mould cavity via the sprue (11) of the first mould plate (10), in order to over-mould the decorative blank (40), as is described in more detail below.

As is illustrated in FIG. 3, the core is then changed and the first core (22) is replaced by a second core (23). In this position the core (23) forms a male mould and a second mould cavity (14) is created between the surface (25) of the second male mould (23) and the decorative blank (40), into which cavity a further injection moulding material is injected through the second sprue, in order to back-mould the decorative blank (40).

The method of the present invention will now be described, purely by way of example, with reference to the method sequences which are illustrated in FIGS. 1-5.

First of all, as is illustrated in FIG. 1, a decorative blank (40) is introduced into the apparatus. At this point, the apparatus is in the open position, wherein the first mould plate (10) and the clamping means (30) are located in the uppermost position in the direction of axis M. Furthermore, a first core (22) is arranged in the frame (21) of the second mould plate.

In a next method step, the clamping means (30) is then moved either together with the first mould plate (10) or independently thereof along the axis M towards the second mould plate (20). This movement effects shaping of the decorative blank (40), which has a visible side (41) and a backing side (42). Thus, a decorative preform is initially produced in the apparatus according to the invention. The clamping means (30) is moved towards the second mould plate (20) until a circumferential zone (44) is fixed precisely in position and clamped between the clamping means (30) and the frame (21) of the second mould plate (20).

If the first mould plate (10) was not moved towards the second mould plate (20) at the same time as the clamping means (30), this is effected in a subsequent step, in order to bring the apparatus into its closed position, as shown in FIG. 2. In the closed position, as mentioned above, a first mould cavity (12) is formed between the decorative preform formed from the decorative blank (40) (hereinafter workpiece 40), i.e. between the visible side (41) of the workpiece (40), and the wall (32) of the clamping means (30) together with the surface (13) of the first mould plate (10). A preferably transparent synthetic resin is then injected into this mould cavity through the sprue (11) and thus the visible side of the workpiece (40) is over-moulded. Once the over-moulding (15) has hardened, as illustrated in FIG. 3, the core (22) is removed downwards out of the frame (21) of the second mould plate (20) along axis M and replaced by the second core (23). This change may be achieved for example by a rotary table, slide or cube system.

Between the surface (25) of the second core (23) and the backing side (42) of the workpiece (40) there is then formed a second mould cavity (14), as described above.

Once the core (23) has been introduced and the mould cavity (14) created, an injection moulding material is injected through the second sprue into the mould cavity (14), in order to back-mould the backing side of the workpiece (40) and form a backing layer (16).

Then, as is illustrated in FIG. 4, the first mould plate (10) is moved away from the second mould plate (20) and the clamping means (30) along axis M, in order to bring the apparatus in its open position. Even in the open position, the circumferential zone of the workpiece (40) remains clamped between the clamping means (30) and the frame (21). Once the apparatus is in the position illustrated in FIG. 4, the core (23) is moved in a direction along axis M relative to the frame (21) towards the first mould plate (10). Since, when this movement occurs, the circumferential zone of the workpiece (40) is still clamped or fixed between the clamping means (30) and the frame (21), on this movement the clamped circumferential zone is sheared off by the relative movement of the remaining part of the workpiece, positioned inside the circumferential zone, at the edges (27) and (33) of the frame (21) and the clamping means (30) respectively, in order in this way to produce the outer contour of the finished decorative element (43), which may be trimmed in this way to its final dimensions (see FIG. 5).

As is clear from FIG. 5 and has been described above, the wall (32) of the clamping means (30), which forms a side portion of the over-moulded visible side of the decorative element (43), tapers towards the second mould plate (20). In this way, this side portion is provided with a type of undercut, which could not be achieved with conventional punching out, namely a downwards movement from above onto the decorative element and onto a counter-punch. This is only possible in that the male mould in the drawings is moved upwards out of the frame (21) in the direction of the first mould plate (10), so allowing trimming.

If, alternatively, the taper was formed in the opposite direction, i.e. if the opening (31) in the clamping means (30) or the wall (32) thereof tapered towards the first mould plate (10), the male mould (22) would have to be moved in an opposite direction M, namely downwards in the drawings relative to the frame (21), in order to enable such trimming.

In order to remove the waste (44) from the apparatus, the clamping means is finally moved in the direction of the first mould plate (10) or upwards in the drawings, such that the waste (44) or the severed part of the workpiece (40) may be removed from the apparatus.

In addition, after completion of trimming, the decorative element (43) is ejected from the apparatus according to the invention by the relative movement (22) of the core and may accordingly be conveyed to a further station, for example for packaging.

The apparatus according to the invention and the method according to the invention make possible simple production of a decorative element (43) which is both over-moulded on its visible side (41) and back-moulded on its backing side (42). In addition, the present invention makes possible a simple, uncomplicated apparatus and a corresponding method with which the decorative element (43) may be trimmed over its entire outer circumference or its contour for example to its final dimensions, which is impossible with conventional cutting dies due to the inherent conical or tapered portion (undercut), such that the method and the apparatus of the present invention do not require subsequent finishing of the decorative element (43) to achieve the final dimensions. In addition, all the method steps, namely shaping, over- and back-moulding and trimming, are performed in a single apparatus, of which the main components, which have been mentioned above, are movable solely along an axis M or parallel thereto. In this way, a very simple structure is achieved, in which movements perpendicular or at an angle to the axis M, which would require a more complicated structure, are not necessary.

Furthermore, in the present invention the core (23) serves both as a male mould and as a cutting die, wherein the entire core (23) serves as a cutting die.

Although the present invention has been explained in detail with reference to a purely exemplary embodiment, it goes without saying that the present invention is not limited to this embodiment, but rather that modifications and changes are possible within the scope of the following claims.

The invention claimed is:

1. A method of producing decorative elements (43), comprising:
   insertion of a flat, flexible decorative blank (40) with a visible side (41) and a backing side (42) as the workpiece into an apparatus;
   fixing of the workpiece (40) precisely in position in the apparatus, wherein at least part of the circumferential zone (44) of the workpiece is clamped;
   shaping of the workpiece (40) in the apparatus;
   over-moulding the visible side (41) of the workpiece (40) with synthetic resin in the apparatus, wherein said over-moulding is performed with a first core of the apparatus;
   exchanging the first core with a second core of the apparatus which differs from the first core;
   back-moulding the backing side (42) of the workpiece (40) in the apparatus, wherein said back-moulding is performed with the second core of the apparatus; and
   following said over-moulding and said back-moulding, trimming of the workpiece over the entire circumference by a relative movement of the fixed circumferential zone (44) of the workpiece relative to the remaining area of the workpiece positioned inside the circumferential zone and ejecting the trimmed workpiece by the relative movement of said trimming;
   wherein said trimming comprises moving the second core relative to a mould plate and a clamp in an axial direction toward a further mould plate.

2. The method according to claim 1, wherein the decorative blank (40) is a wood veneer, a stone veneer or a film.

3. The method according to claim 1, wherein the relative movement takes place along one axis (M) and all moving parts of the apparatus are moved solely parallel to the one axis.

4. The method according to claim 1, wherein the decorative elements are elements of a vehicle.

5. The method according to claim 1, wherein said fixing, said shaping, said over-moulding, said back-moulding and said trimming are performed without removing the workpiece from the apparatus.

6. The method according to claim 1, wherein said fixing, said trimming and said exchanging are performed along a single axis (M).

7. The method according to claim 1, wherein:
   said fixing comprises clamping the circumferential zone of the workpiece between the mould plate and the clamp,
   said over-moulding comprises injecting resin into a first mould cavity between the workpiece and the further mould plate while supporting the workpiece on the backing side with the first core that extends into a central space defined by the mould plate and the clamp, and
   said back-moulding comprises injecting resin into a second mould cavity between the workpiece and the second core while supporting the workpiece of the visible side with the further mould plate.

* * * * *